(12) United States Patent
Hwang et al.

(10) Patent No.: US 8,234,879 B2
(45) Date of Patent: Aug. 7, 2012

(54) METHOD FOR CONTROLLING MOTOR OF AIR CONDITIONER AND MOTOR CONTROLLER OF THE SAME

(75) Inventors: Sun Ho Hwang, Changwon-si (KR); Sug Mun Choung, Changwon-si (KR)

(73) Assignee: LG Electronics Inc., Seoul (KR)

( * ) Notice: Subject to any disclaimer, the term of this patent is extended or adjusted under 35 U.S.C. 154(b) by 910 days.

(21) Appl. No.: 12/289,619

(22) Filed: Oct. 30, 2008

(65) Prior Publication Data

US 2009/0113908 A1        May 7, 2009

(30) Foreign Application Priority Data

Oct. 31, 2007   (KR) .......................... 10-2007-0110263

(51) Int. Cl.
  *F25B 1/00*        (2006.01)
  *F25B 49/00*     (2006.01)
(52) U.S. Cl. .......... 62/228.1; 62/228.4; 62/230; 417/42; 417/44.1; 417/45
(58) Field of Classification Search .................... 62/126, 62/127, 228.1, 228.4, 228.5, 230; 417/2, 417/12, 13, 18, 42, 44.11, 45, 53
See application file for complete search history.

(56) References Cited

U.S. PATENT DOCUMENTS

| | | | |
|---|---|---|---|
| 3,877,243 A | | 4/1975 | Kramer |
| 4,257,238 A | * | 3/1981 | Kountz et al. ................. 62/176.3 |
| 4,364,237 A | * | 12/1982 | Cooper et al. .................. 62/160 |
| 4,709,292 A | * | 11/1987 | Kuriyama et al. .............. 361/22 |
| 4,736,595 A | * | 4/1988 | Kato ................................ 62/160 |
| 4,738,118 A | * | 4/1988 | Kanazawa ....................... 62/215 |
| 4,850,203 A | * | 7/1989 | Okada et al. .................... 62/209 |
| 4,856,286 A | * | 8/1989 | Sulfstede et al. ................. 62/89 |
| 5,210,684 A | | 5/1993 | Nam |
| 5,371,645 A | * | 12/1994 | Mochizuki ...................... 361/22 |
| 5,446,354 A | * | 8/1995 | Hiruma .................... 318/400.21 |
| 5,572,876 A | * | 11/1996 | Um ................................... 62/89 |

(Continued)

FOREIGN PATENT DOCUMENTS

EP        539163  A2  *  4/1993

(Continued)

OTHER PUBLICATIONS

JP8088994A_English Machine Translation.pdf.*

*Primary Examiner* — Cheryl J Tyler
*Assistant Examiner* — Paolo Gonzalez
(74) *Attorney, Agent, or Firm* — McKenna Long & Aldridge LLP

(57) ABSTRACT

A motor controlling method and apparatus of an air conditioner are disclosed. It is checked whether or not an operation frequency of a compressor motor is the same as or greater than a certain frequency and it is also checked whether or not a detected velocity of a fan motor is the same as or lower than a certain velocity during a certain time period. If the operation frequency is the same as or greater than the certain frequency and the detected velocity is the same as or lower than the certain velocity during a certain time period, the compressor motor is temporarily stopped. Because the compressor motor operates according to operational conditions of the fan motor, an overload can be prevented.

10 Claims, 7 Drawing Sheets

U.S. PATENT DOCUMENTS

| | | | |
|---|---|---|---|
| 5,823,004 A | 10/1998 | Polley et al. | |
| 5,950,439 A * | 9/1999 | Peterson et al. | 62/80 |
| 5,970,733 A * | 10/1999 | Hamaoka et al. | 62/228.4 |
| 6,002,218 A * | 12/1999 | Toda et al. | 318/66 |
| 6,065,298 A * | 5/2000 | Fujimoto | 62/230 |
| 6,153,993 A * | 11/2000 | Oomura et al. | 318/434 |
| 6,208,109 B1 * | 3/2001 | Yamai et al. | 318/716 |
| 6,682,310 B2 * | 1/2004 | Yoo et al. | 417/42 |
| 7,967,572 B2 * | 6/2011 | Ishikawa et al. | 417/18 |
| 2001/0036093 A1 * | 11/2001 | Tanikawa et al. | 363/37 |
| 2002/0026801 A1 | 3/2002 | Yamashita | |
| 2002/0157404 A1 * | 10/2002 | Pauwels | 62/84 |
| 2002/0170307 A1 * | 11/2002 | Nishizuka et al. | 62/230 |
| 2003/0000236 A1 * | 1/2003 | Anderson et al. | 62/228.3 |
| 2003/0026703 A1 * | 2/2003 | Yoo et al. | 417/44.11 |
| 2003/0108430 A1 * | 6/2003 | Yoshida et al. | 417/44.11 |
| 2003/0175125 A1 * | 9/2003 | Kwon et al. | 417/44.11 |
| 2003/0228229 A1 * | 12/2003 | Yoshimura et al. | 417/199.1 |
| 2005/0086959 A1 * | 4/2005 | Wilson et al. | 62/228.3 |
| 2005/0151019 A1 * | 7/2005 | Stevens | 244/135 R |
| 2005/0204760 A1 * | 9/2005 | Kurita et al. | 62/228.1 |
| 2005/0271526 A1 * | 12/2005 | Chang et al. | 417/417 |
| 2006/0061321 A1 * | 3/2006 | Han et al. | 318/801 |
| 2006/0130504 A1 * | 6/2006 | Agrawal et al. | 62/228.4 |
| 2007/0013325 A1 * | 1/2007 | Kiuchi et al. | 318/34 |

FOREIGN PATENT DOCUMENTS

| | | |
|---|---|---|
| EP | 1 632 737 A2 | 3/2006 |
| EP | 1 912 029 A1 | 4/2008 |
| JP | 5-256496 | 10/1993 |
| JP | 6-221645 | 8/1994 |
| JP | 8-088994 | 4/1996 |
| JP | 9-210490 | 8/1997 |
| JP | 10-115448 A | 5/1998 |
| WO | WO 2004/097308 A1 | 11/2004 |
| WO | WO 2007046794 A1 * | 4/2007 |

* cited by examiner (a)

(b)

(a)

(b)

METHOD FOR CONTROLLING MOTOR OF AIR CONDITIONER AND MOTOR CONTROLLER OF THE SAME

CROSS-REFERENCE TO RELATED APPLICATION

This application claims the benefit of Korean Patent Application No. 10-2007-0110263 filed on Oct. 31, 2007, which is hereby incorporated by reference in its entirety as if fully set forth herein.

BACKGROUND

1. Field of the Disclosure

The present invention relates to a motor controlling method and apparatus of an air conditioner, and more particularly, to a motor controlling method and apparatus of an air conditioner capable of preventing an overload by operating a compressor motor according to operational conditions of a fan motor.

2. Background

In general, the air conditioner is divided into an integration type air conditioner and a separation type air conditioner. The integration type air conditioner and the separation type air conditioner have the same function, but the integration type air conditioner having integrated cooling and heat releasing functions is installed in a hole made in the wall of a house or installed on a frame hung up on a window of the house, while the separation type air conditioner includes an indoor unit installed at an inner side of a building to perform cooling and heating operations and an outdoor unit installed at an outer side of the building to perform heat releasing and compression functions, the indoor and outdoor units being connected by a refrigerant pipe.

A motor is used for a compressor, a fan, or the like, of the air conditioner, and a motor control device is used to drive the motor. The motor control device of the air conditioner receives commercial AC power, converts the AC power into a DC voltage, converts the DC voltage into commercial AC power of a certain frequency, and supplies the same to the motor to control driving of the motor of the compressor, the fan, or the like.

SUMMARY

An object of the present invention is to provide a motor controlling method and apparatus of an air conditioner capable of preventing an overload by operating a compressor motor according to operational conditions of a fan motor of the air-conditioner.

To achieve the above object, there is provided a motor controlling method of an air conditioner, including: determining whether or not an operation frequency of a compressor motor is the same as or greater than a certain frequency; determining whether or not a detected velocity of a fan motor is lower than a certain velocity during a certain time period; and temporarily stopping the compressor motor if the operation frequency is the same as or greater than the certain frequency and the detected velocity is lower than the certain velocity during the certain time period.

To achieve the above object, there is also provided a motor controlling apparatus of an air conditioner, including: a compressor inverter that drives a compressor motor; a fan inverter that drives a fan motor; a velocity detecting unit that detects the velocity of the fan motor; and a controller that temporarily stops the compressor motor if an operation frequency of the compressor motor is the same as or greater than a certain frequency and the detected velocity of the fan motor is lower than a certain velocity during a certain time period.

The motor controlling method and apparatus of an air conditioner according to an embodiment of the present invention can prevent an overload by operating a compressor motor according to operational conditions of a fan motor. In addition, by stopping the compressor motor according to conditions, circuit elements can be protected. Further, because an abnormal state is displayed, a user can easily recognize a corresponding abnormal operation.

DETAILED DESCRIPTION

Embodiments of the present invention will now be described in detail with reference to the accompanying drawings.

Figure 1:
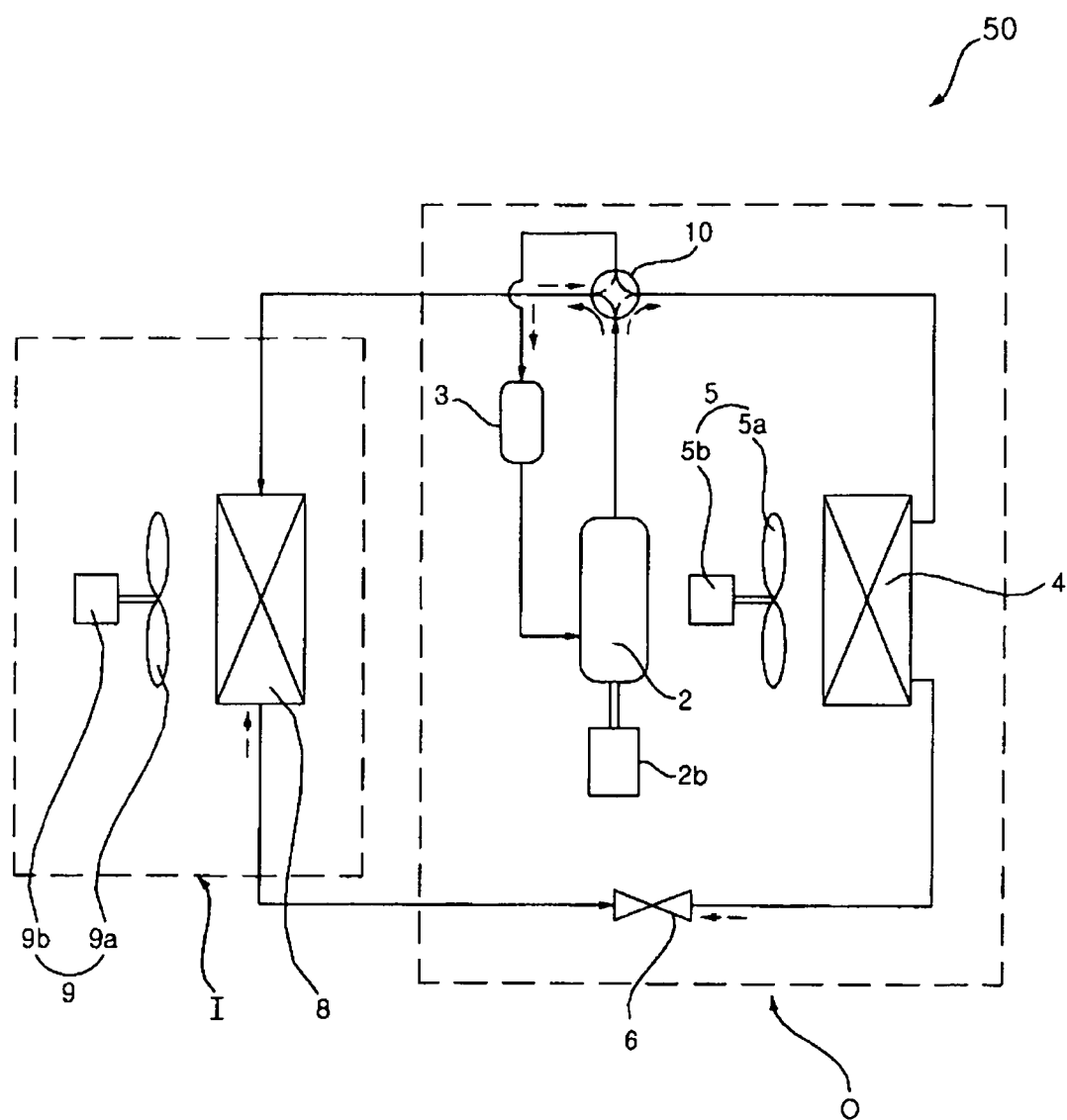
FIG. 1 is a schematic view of an air conditioner according to an embodiment of the present invention.

FIG. 1 is a schematic view of an air conditioner according to an embodiment of the present invention.

With reference to FIG. 1, an air conditioner 50 includes an indoor unit (I) and an outdoor unit (O).

The outdoor unit (O) includes a compressor 2 that compresses a refrigerant, a compressor motor 2b that drives the compressor 2, an outdoor heat exchanger 4 that release of heat of the compressed refrigerator, an outdoor air blower 5 including an outdoor fan 5a that is disposed at one side of the outdoor heat exchanger 5 and accelerates heat releasing of the refrigerant and a motor 5b that rotates the outdoor fan 5a, an expansion device 6 that expands a condensed refrigerant, a cooling/heating switching valve 10 that changes a flow path of the compressed refrigerant, and an accumulator 3 that temporarily stores a gasified (vaporized) refrigerant to remove moisture and a foreign substance, and supplies the refrigerant of a certain pressure to the compressor.

The indoor unit (I) includes an indoor heat exchanger 8 disposed in a room and performing a cooling/heating function, and an indoor air blower 9 including an indoor fan 9a disposed at one side of the indoor heat exchanger 8 and accelerating releasing heat of a refrigerant and a motor 9b that rotates the indoor fan 9a.

At least one indoor heat exchanger 8 may be installed. The compressor 2 may include at least one of an inverter compressor and a constant velocity compressor.

The air-conditioner 50 may be constructed as a cooling device for cooling an indoor area or as a heat pump for cooling or heating the indoor area.

Figure 2:
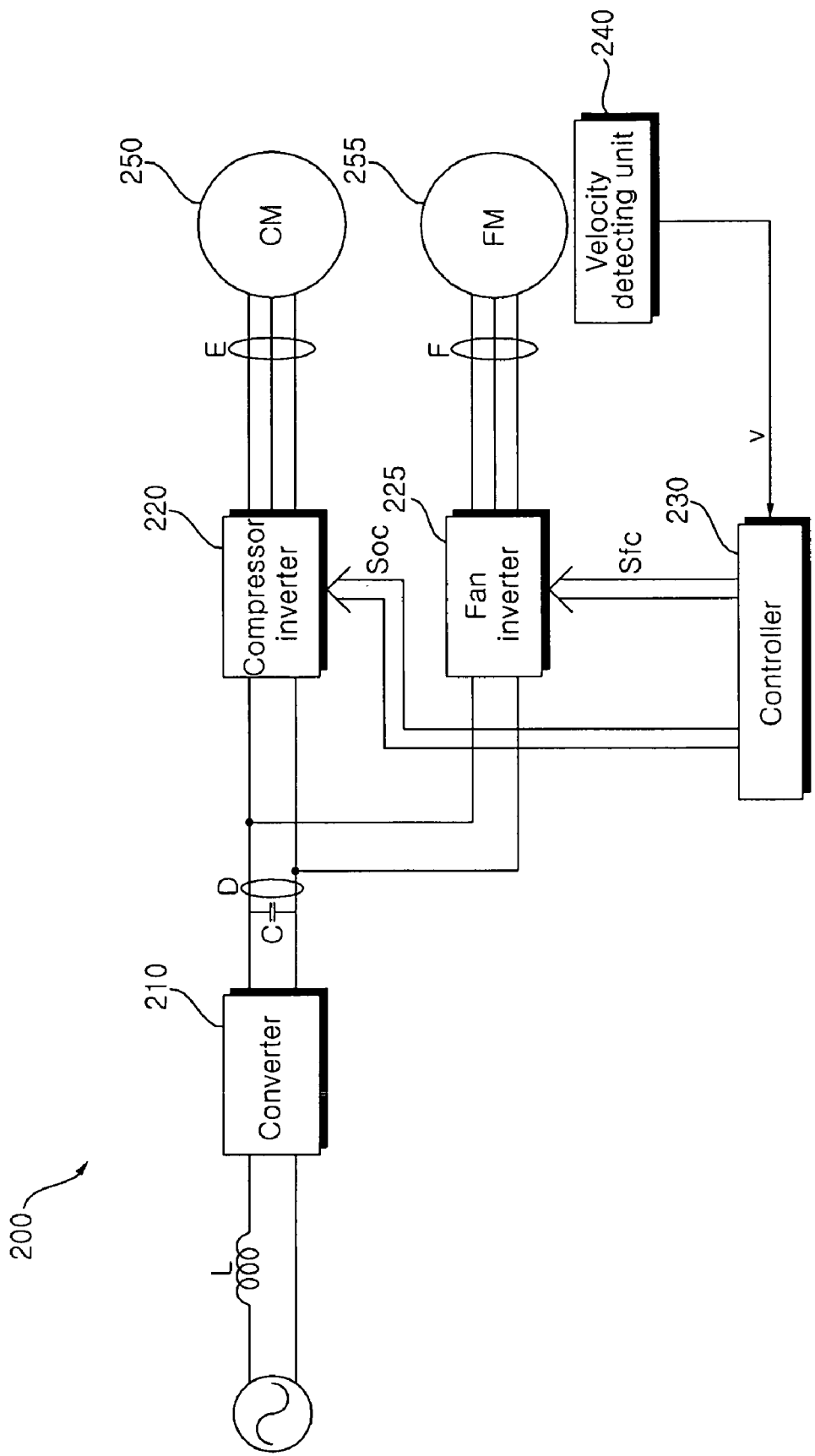
FIG. 2 is a schematic block diagram of a motor controlling apparatus of an air conditioner according to an embodiment of the present invention.

FIG. 2 is a circuit diagram of a motor controlling apparatus of an air conditioner according to an embodiment of the present invention.

As shown in FIG. 2, the motor controlling apparatus 200 of an air conditioner according to an embodiment of the present invention includes a compressor inverter 220 that drives a compressor motor 250, a fan inverter 225 that drives a fan motor 255, a controller 230, and a velocity detecting unit 240.

The motor controlling apparatus of an air conditioner in FIG. 2 may further include a reactor (L), a converter 210, and a smoothing capacitor (C). Also, the motor controlling apparatus of the air conditioner may further include a dc terminal voltage detecting unit (D), output current detecting units (E and F), etc.

The reactor (L) boosts the commercial AC power and supplies the same to the converter 210. In detail, the reactor (L) stores AC power and performs a boosting operation to supply the boosted AC power to the converter 210 according to ON/OFF operations of a plurality of converter switches provided in the converter 210. The reactor (L) is used to correct a power factor of AC power and removes a harmonic current between the commercial AC power and the converter 210 to protect a system (line) or the converter element.

The single-phase AC power is illustrated as the commercial AC power, but the present invention is not limited thereto, and three-phase AC power can be also used. When the three-phase AC power is used as the commercial AC power, a common mode LCL filter (not shown) may be used in place of the reactor (L).

The converter 210 includes a plurality of converter switching elements, and converts the commercial AC power, which has passed through the reactor (L), into DC power according to ON/OFF operations of the switching element.

If the commercial AC power is the single-phase power as shown in the drawing, for example, a half-bridge type converter including two switching elements and four diodes may be implemented but the single-phase converter is not limited thereto.

If the commercial AC power is three-phase AC power, like the inverter, in the converter, upper and lower arm switching elements may make a pair, a total three pairs of upper and lower arm switching elements may be connected in parallel, and diodes may be connected in anti-parallel with the respective switching elements.

The switching elements of the converter 210 perform ON/OFF operations by a converter switching control signal Scc. The converter switching control signal Scc may be outputted from the controller 230 (to be described), but without being limited thereto, it may be also outputted from a separate controller.

The smoothing capacitor (C) is connected with an output terminal of the converter 210, and a DC voltage from the converter 210 is smoothed by the smoothing capacitor (C). Hereinafter, the output terminal of the converter 210 is called a dc terminal or a dc link terminal. The DC voltage smoothed at the dc terminal is applied to the inverters 220 and 225.

The compressor inverter 220 includes a plurality of inverter switching elements and converts the smoothed DC power into the commercial AC power of a certain frequency according to ON/OFF operations of the switching elements to drive the compressor motor 250.

The fan inverter 225 includes a plurality of inverter switching elements, converts the smoothed DC power into the commercial AC power according to ON/OFF operations of the switching elements, and outputs the same to the fan motor 255.

In the compressor inverter 220 and the fan inverter 225, serially connected upper and lower arm switching elements may make a pair, and a total three pairs of upper and lower arm switching elements may be connected in parallel. Diodes may be connected in anti-parallel with the respective switching elements.

The switching elements in the compressor inverter 220 and the fan inverter 225 perform ON/OFF operations according to switching control signals Soc and Sfc from the controller 230.

The compressor motor 250 and the fan motor 255 are three-phase motors including a stator and a rotor, in which the rotor rotates as each phase AC power of a certain frequency is applied to a coil of each phase stator. The compressor motor 250 and the fan motor 255 may include various types of motors such as a BLDC motor, an synRM motor, or the like.

In order to control a switching operation of the converter 210, the controller 230 outputs a converter switching control signal Scc to the converter 210. The switching control signal Scc is a PWM switching control signal which is generated based on the voltage of the dc terminal and outputted to the converter 210.

Further, in order to control a switching operation of the compressor inverter 220, the controller 230 outputs the PWM switching control signal Soc to the compressor inverter 220. Also, in order to control a switching operation of the fan inverter 225, the controller 230 outputs the PWM switching control signal Sfc to the fan inverter 225.

The velocity detecting unit 240 detects the velocity (v) of the fan motor 255 and applies the detected velocity (v) to the controller 230. In this case, in order to detect the velocity (v) of the fan motor 255, the velocity detecting unit 240 may include a sensor, i.e., a hall sensor, for detecting the position of the rotor of the fan motor 255. A position signal may be detected by the hall sensor, based on which the velocity (v) can be detected. Further, the velocity detecting unit 240 may detect an output current flowing across the fan motor 255 and estimate the velocity (v) according to a certain algorithm based on the detected output current. The detection of the output current may be performed by an output current detecting unit (F) (to be described).

The dc terminal voltage detecting unit (D) detects the voltage Vdc of the dc terminal. In this case, a resistor between both ends of the dc terminal may be used as the dc terminal voltage detecting unit (D). The dc terminal voltage detecting unit (D) may detect the dc terminal voltage Vdc on average, and the switching control signal Scc of the converter 210 is determined based on the detected dc terminal voltage Vdc.

An output current detecting unit (E) detects an output current of an output terminal of the compressor inverter 220, namely, the current flowing across the compressor motor 250. The output current detecting unit (E) may be positioned between the compressor inverter 220 and the compressor motor 250, and in order to detect the current, a current sensor, a CT (Current Transformer), a shunt resistor, or the like, may be used. The output current detecting unit (E) may be a shunt resistor having one end connected with the three lower arm switching elements of the compressor inverter 220. The detected output current is applied to the controller 230, and the switching control signal Soc of the compressor inverter 220 is determined based on the detected output current.

An output current detecting unit (F) detects an output current of an output terminal of the fan inverter 225, namely, the current flowing across the fan motor 255. The position of the output current detecting unit (F) is similar to that of the output current detecting unit (E). The detected output current is applied to the controller 230, and the switching control signal Sfc of the fan inverter 225 is determined based on the detected output current.

Figure 3:
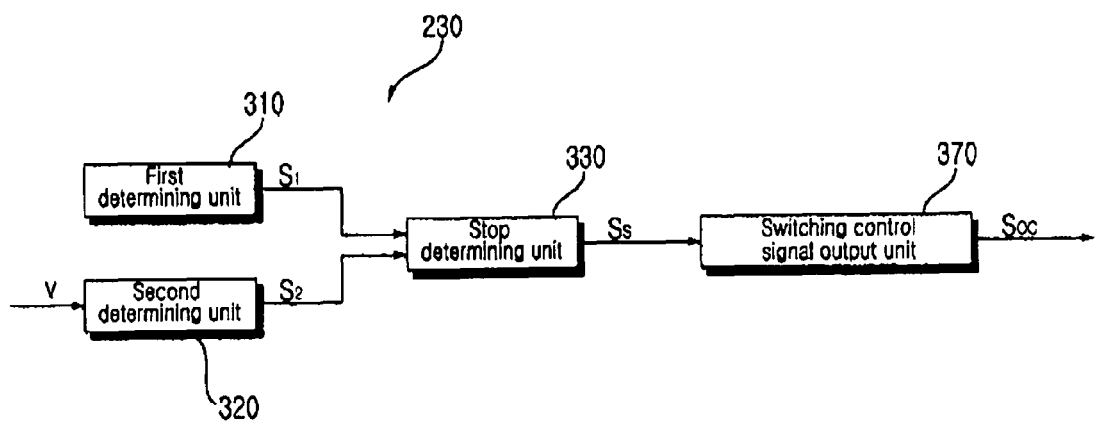
FIGS. 3a and 3b are schematic internal block diagrams of a controller in FIG. 2.
Figure 3:
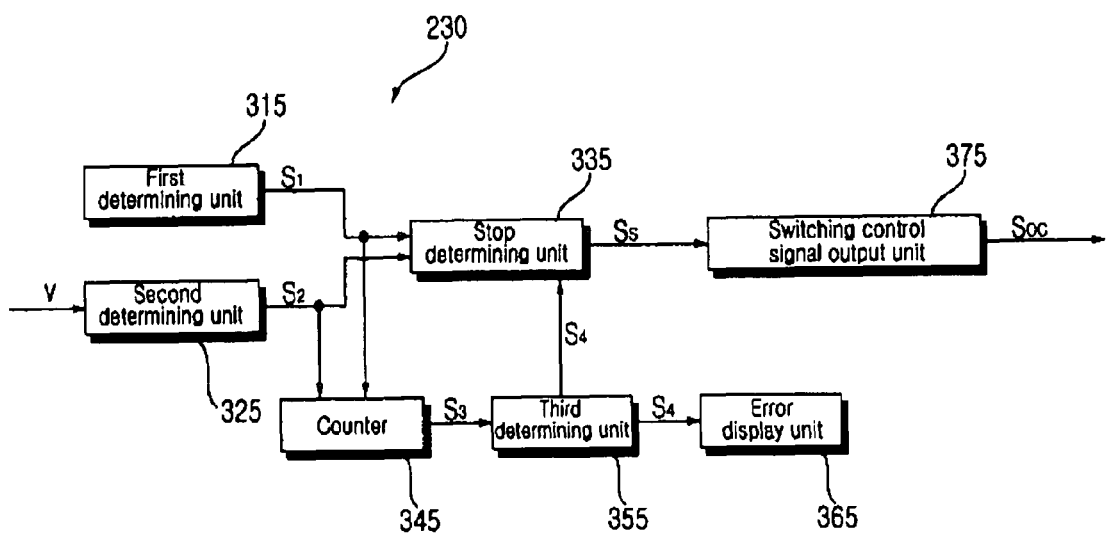

FIGS. 3a and 3b are schematic internal block diagrams of the controller in FIG. 2.

Specifically, FIG. 3a shows one example of the controller. The controller 230 in FIG. 3a includes a first determining unit 310, a second determining unit 320, a stop determining unit 330, and a switching control signal output unit 370.

The first determining unit 310 determines whether or not an operation frequency (an actual operation frequency or an operation frequency command) of the compressor motor 250 is the same as or greater than a certain frequency. Here, the certain frequency may be within the range of about 10 Hz to 20 Hz. Namely, the first determining unit 310 determines whether or not the operation frequency of the compressor motor 250 is increased after a initial start and the compressor motor normally operates, or whether or not the compressor motor is in the course of shifting to a normal operation. The first determining unit 310 applies a determination signal S1 to the stop determining unit 330.

The second determining unit 320 determines whether or not the velocity (v) of the fan motor 255 detected by the velocity detecting unit 240 is the same as or lower than a certain velocity during a certain time period. Here, the certain velocity may be substantially scores of rpm. The certain velocity is a lower limit value, and the second determining unit determines whether or not the fan motor 255 continuously operates at a velocity lower than the lower limit value abnormally and whether or not the operation time is longer than a certain time period. Here, the certain time period may be determined according to design specifications and may be within substantially one minute. The second determining unit 320 applies a determination signal S2 to the stop determining unit 330.

The stop determining unit 330 receives the determination signals S1 and S2 respectively from the first and second determining units 310 and 320, and if the operation frequency of the compressor motor 250 is the same as or greater than the certain frequency and if the detected velocity (v) of the fan motor 255 is lower than the certain velocity during a certain time period, the stop determining unit 330 outputs a pause signal Ss to make the compressor motor 250 stop temporarily.

The switching control signal output unit 370 outputs a switching control signal Soc to the compressor motor 250, and if it receives the pause signal Ss from the stop determining unit 330, the switching control signal output unit 370 does not output the switching control signal Soc to make the compressor motor 250 stop, any further.

As described above, if the compressor motor 250 is determined to normally operate and if the fan motor 255 abnormally operates, the operation of the compressor motor 250 is temporarily stopped to thus reduce unnecessary power consumption and an overload in the controlling apparatus. In addition, the circuit elements of the controlling apparatus can be protected.

FIG. 3b shows another example of the controller. The controller 230 in FIG. 3b is almost similar to the controller 230 in FIG. 3a, except that it further includes a counter 345, a third determining unit 355, and an error display unit 365. Namely, a first determining unit 315, a second determining unit 325, a stop determining unit 335, and a switching control signal output unit 375 are the same as those in the controller in FIG. 3a.

The counter 345 counts the number of times of temporarily stopping at the same time when the stop determining unit 335 outputs the pause signal Ss as the operation frequency of the compressor motor 250 is the same as or greater than the certain frequency and as the detected velocity (v) of the fan motor 255 is the same as or lower than the certain velocity during the certain time period. The counter 345 applies a count signal S3 to the third determining unit 355.

The third determining unit 355 determines whether or not the counted number is the same as or greater than a certain number during a second certain time period according to the count signal S3 inputted from the counter 345. Here, the second certain time period and the certain number may be variably set according to design specifications and may be, for example, one hour and five times. The third determining unit 355 applies a determination signal S4 to the stop determining unit 335.

The stop determining unit 335 receives the determination signal S4 from the third determining unit 355, and if the counted number in the counter 345 is the same as or greater than a certain number during the second certain time period, the stop determining unit 335 outputs a complete pause signal Ss to make the compressor motor 250 completely stop.

The switching control signal output unit 375 outputs a switching control signal Soc to the compressor motor 250, and in this case, if the complete pause signal Ss is inputted from the stop determining unit 335, the switching control signal output unit 375 does not output the switching control signal Ss to make the compressor motor 250 completely stop, any further.

The error display unit 365 receives the determination signal S4 from the third determining unit 355, and if the counted number in the counter 345 is the same as or greater than a certain number during the second certain time period, the error display unit 365 displays an error. The error display unit 365 may be implemented as various elements such as an LED or the like.

Unlike the controller as shown in FIG. 3b, the stop determining unit 335 counts the number of times of temporarily stopping, and if the counted number is the same as or greater than the certain number during the second certain time period, the stop determining unit 335 may output the complete pause signal Ss. A signal inputted to the error display unit 365 may be applied from the stop determining unit 335.

Besides the temporarily stopping (pause) described with reference to FIG. 3a, the compressor motor 250 may be completely stopped under certain conditions to thus reduce unnecessary power consumption, prevent an overload of the controlling apparatus, and strengthen the protection of the circuit elements in the controlling apparatus.

Although not shown in FIGS. 3a and 3b, the controller 230 may include an estimating unit (not shown) to estimate the velocity based on the output current flowing across the compressor motor 250, a current command generating unit (not shown) to generate a current command value based on the estimated velocity and a velocity command value, and a voltage command generating unit (not shown) to generate a voltage command value based on the current command value and the output current. Further, the controller 230 may include a second estimating unit (not shown) to estimate the velocity based on the output current flowing across the fan motor 255, a second current command generating unit (not shown) to generate a current command value, and a second voltage command generating unit (not shown) to generate a voltage command value.

Figure 4:
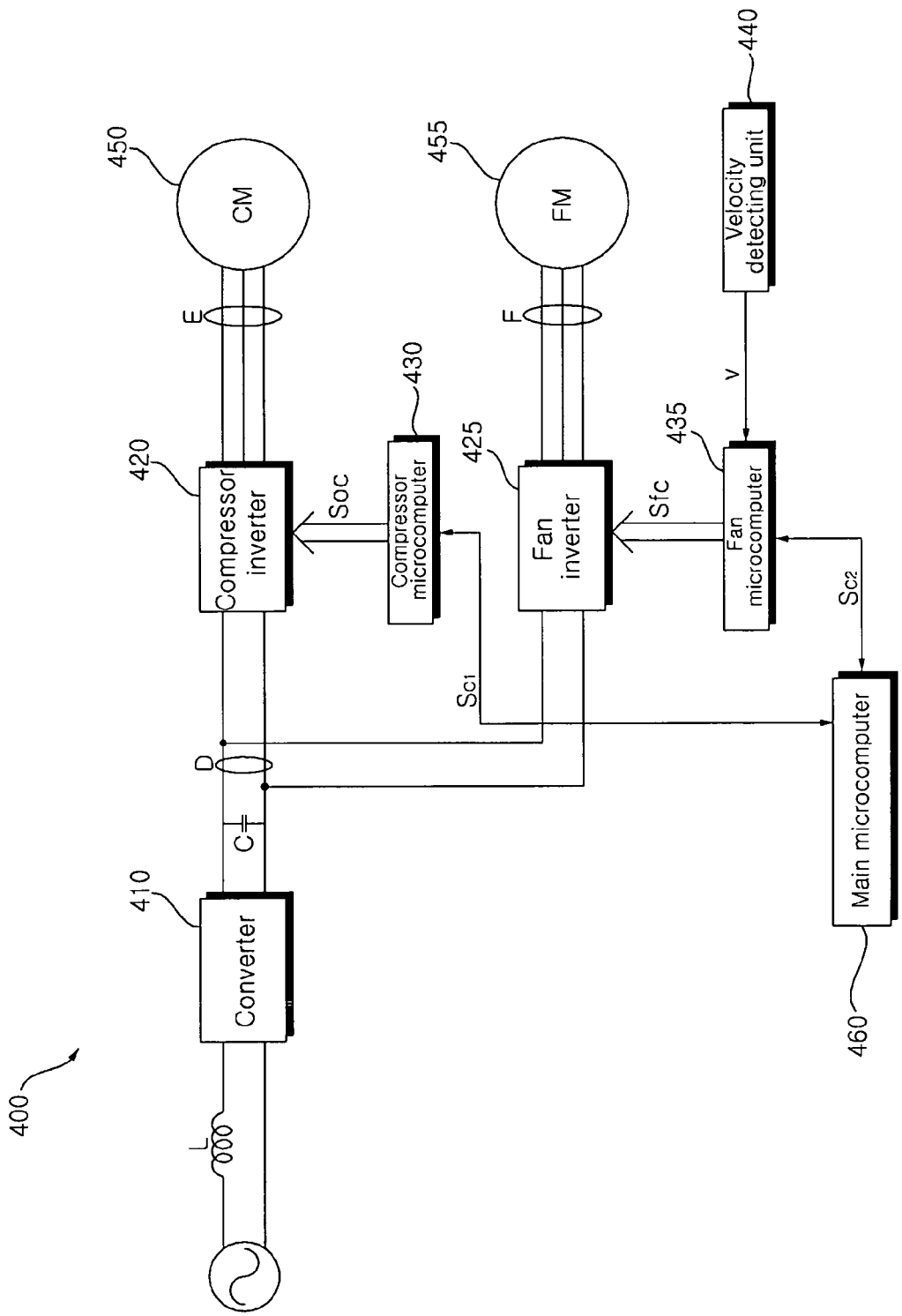
FIG. 4 is a schematic block diagram of a motor controlling apparatus of an air conditioner according to an embodiment of the present invention.

FIG. 4 is a schematic block diagram of a motor controlling apparatus of an air conditioner according to an embodiment of the present invention.

As shown in FIG. 4, a motor controlling apparatus 400 of an air conditioner is almost similar to the motor controlling apparatus 200 of an air conditioner as shown in FIG. 2. Namely, like the motor controlling apparatus 200 as shown in FIG. 2, the motor controlling apparatus 400 as shown in FIG. 4 includes a converter 410, a compressor inverter 420, a fan inverter 425, a velocity detecting unit 440, a compressor motor 450, a fan motor 455, a reactor (L), a smoothing capacitor (C), and output current detecting units (E and F). A difference between the two motor controlling apparatuses is that the controller 230 in FIG. 2 is divided into a compressor microcomputer 430, a fan microcomputer 435, and a main microcomputer 460 in the motor controlling apparatus as shown in FIG. 4.

Description will be made based on the difference. The compressor microcomputer 430 outputs a switching control signal Soc to the compressor inverter 420. The fan microcomputer 435 outputs a switching control signal sfc to the fan inverter 435. The main microcomputer 460 controls the compressor microcomputer 430 and the fan microcomputer 435.

Figure 5:
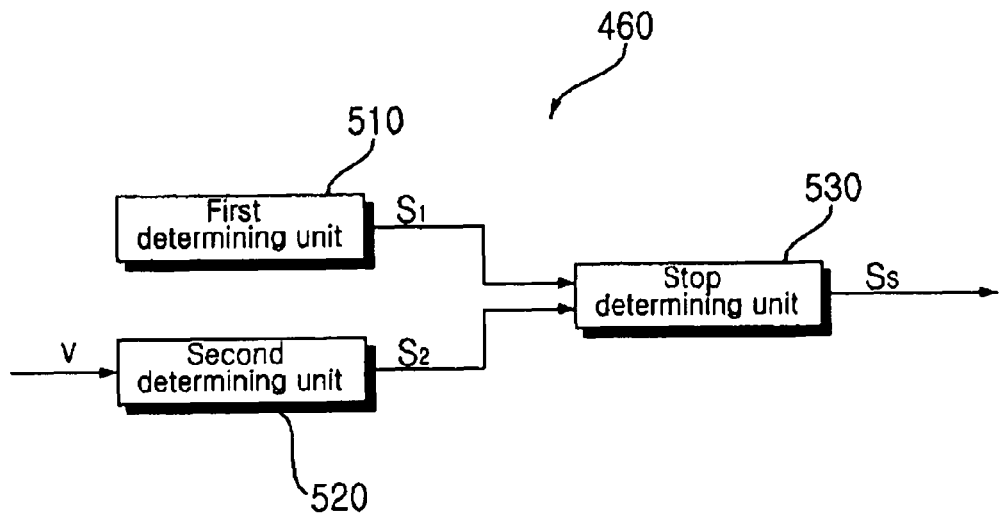
FIGS. 5a and 5b are schematic internal block diagrams of a main microcomputer in FIG. 4.
Figure 5:
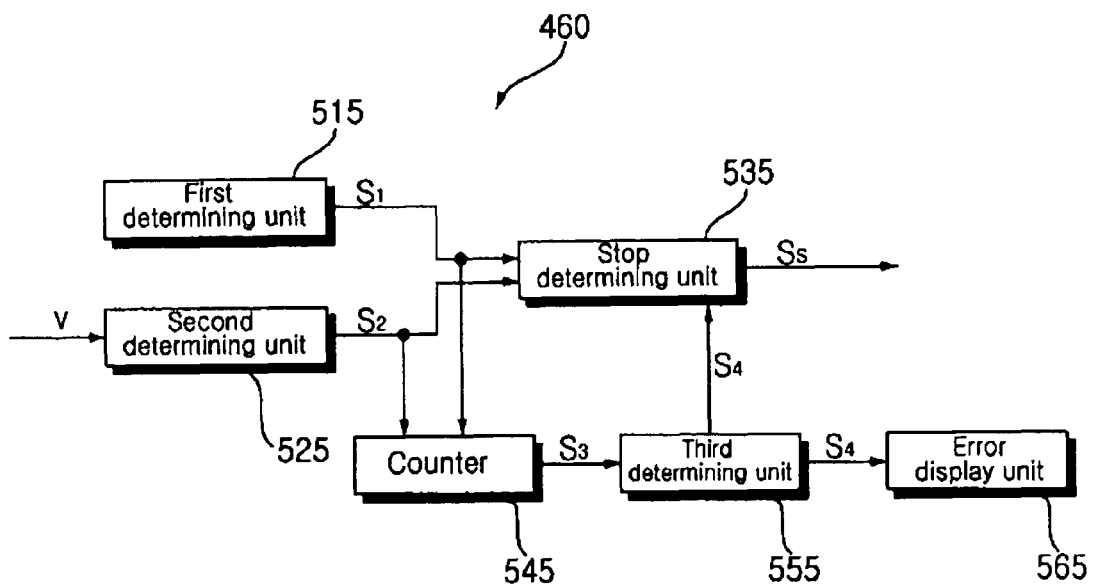

FIGS. 5a and 5b are schematic internal block diagrams of a main microcomputer in FIG. 4.

The main microcomputer 460 in FIG. 5a includes a first determining unit 510, a second determining unit 520, and a stop determining unit 530, like those as shown in FIG. 3a. The functions of the elements of the main microcomputer 460 are the same as those of the controller in FIG. 3a. However, unlike the controller as shown in FIG. 3a, the main microcomputer 460 in FIG. 5a does not have such a switching control signal output unit (not shown) to output the switching control signal Soc to the compressor inverter 420. The switching control signal output unit is included in the compressor microcomputer 430 in FIG. 4.

Although not shown, the compressor microcomputer 430 may include an estimating unit (not shown) to estimate the velocity based on the output current flowing across the compressor motor 450, a current command generating unit (not shown) to generate a current command value based on the estimated velocity and a velocity command value, a voltage command generating unit (not shown) to generate a voltage command value based on the current command value and the output current, and a switching control signal output unit (not shown) to output a switching control signal to the compressor inverter 420.

The fan microcomputer 435 may a second estimating unit (not shown) to estimate the velocity based on the output current flowing across the fan motor 255, a second current command generating unit (not shown) to generate a current command value, and a second voltage command generating unit (not shown) to generate a voltage command value.

Figure 6:
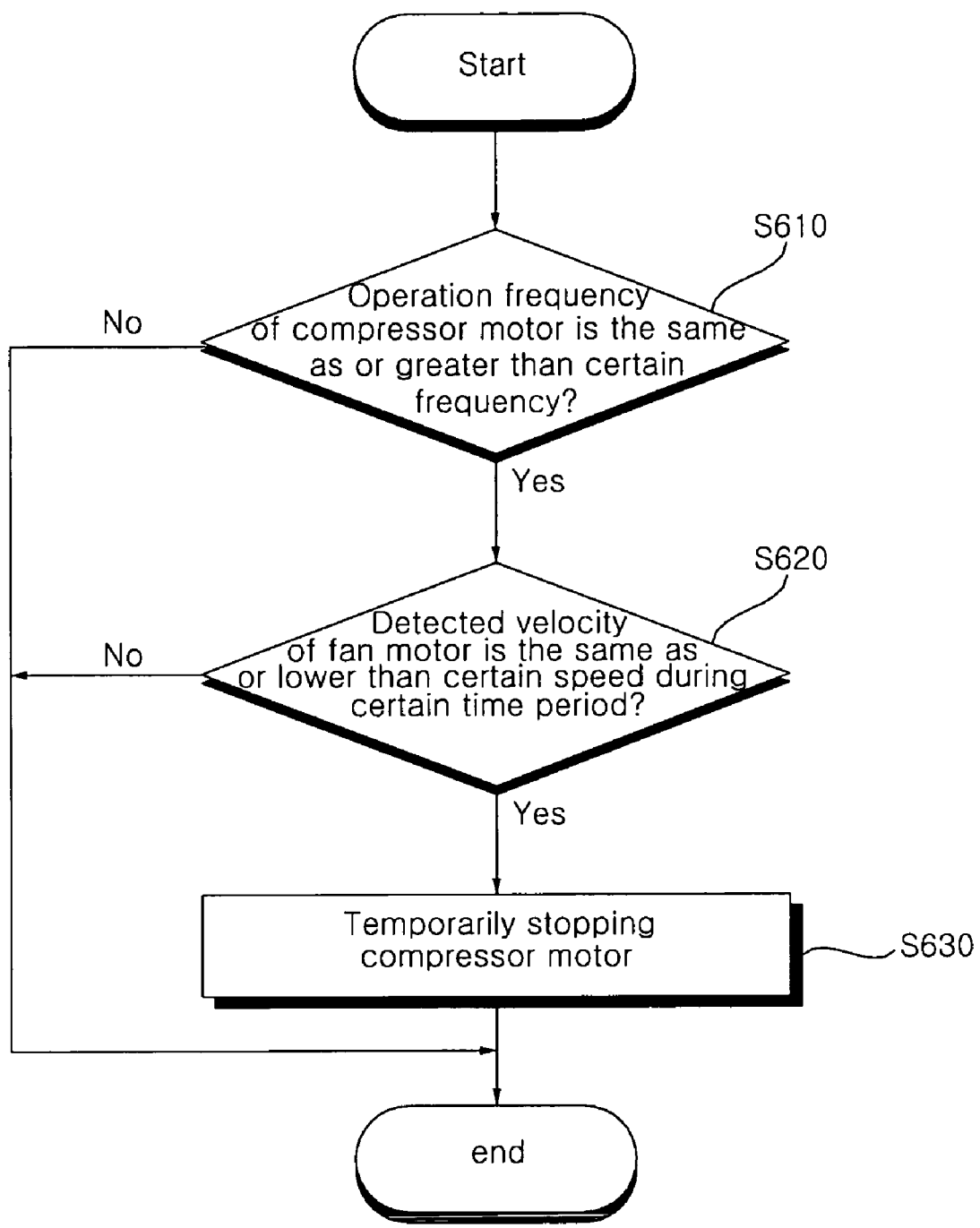
FIG. 6 is a flow chart illustrating the process of a motor controlling method of an air conditioner according to an embodiment of the present invention.

FIG. 6 is a flow chart illustrating the process of a method for controlling a motor of an air conditioner according to an embodiment of the present invention.

As shown in FIG. 6, it is checked whether or not an operation frequency of the compressor motor is the same as or greater than a certain frequency (S610). Here, the certain frequency may be substantially within a range of about 10 Hz to 20 Hz. The range of the certain frequency may be sufficient to allow the operation frequency to increase after an initial start to perform a normal operation or shift to the normal operation.

If the operation frequency of the compressor motor is the same as or greater than the certain frequency, it is checked whether or not a detected velocity of the fan motor is the same as or lower than a certain velocity during a certain time period (S620). Here, the certain velocity may be substantially scores of rpm and the certain time period may be substantially within one minute.

If the operation frequency of the compressor motor is the same as or greater than the certain frequency and the detected velocity of the fan motor is the same as or lower than the certain velocity during the certain time period, the compressor motor is temporarily stopped (S630). If the compressor motor normally operates and the fan motor abnormally operates, the operation of the compressor motor is temporarily stopped to thus reduce unnecessary power consumption and prevent an overload in the controlling apparatus. In addition, the circuit elements within the controlling apparatus can be protected.

Figure 7:
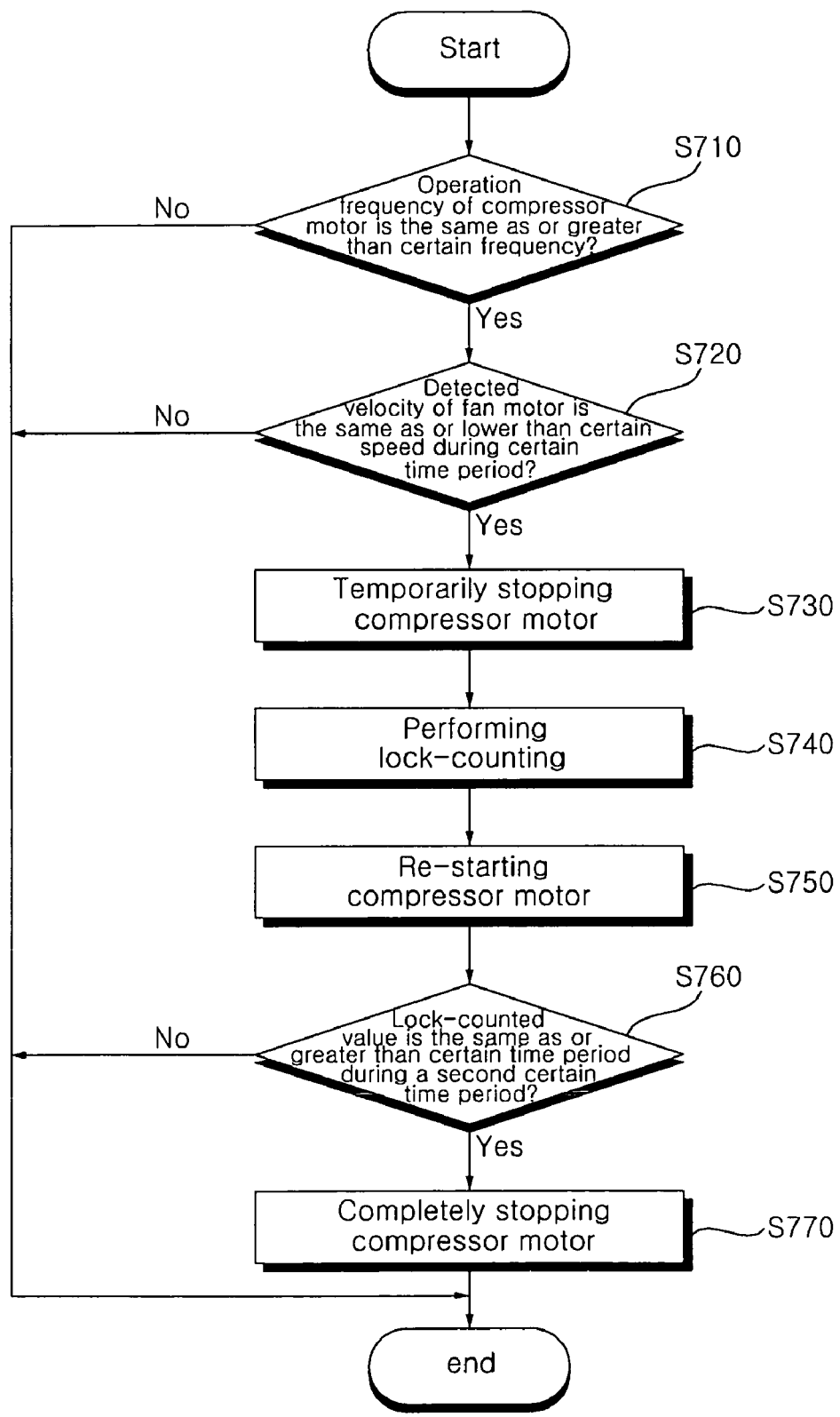
FIG. 7 is a flow chart illustrating the process of a motor controlling method of an air conditioner according to an embodiment of the present invention.

FIG. 7 is a flow chart illustrating the process of a method for controlling a motor of an air conditioner according to an embodiment of the present invention.

As shown in FIG. 7, the motor controlling method of an air conditioner as shown in FIG. 7 is almost similar to that as shown in FIG. 6. Namely, steps S710 to S730 in FIG. 7 are the same as steps S610 to S630 in FIG. 6.

The following description will be mainly focused on the difference. While the compressor motor is temporarily stopped, the number of times of temporarily stopping (pause) is lock-counted (S740). The lock counting may be performed by a separate counter.

Next, the compressor motor is re-started (S750). That is, in a few seconds after the pause, the compressor motor is re-started.

Thereafter, it is checked whether or not the lock-counted value is the same as or greater than a certain number during a second certain time period (S750). Here, the second certain time period may be substantially one hour and the certain number may be substantially five times.

If the number of times of temporarily stopping is the same as or greater than the certain number during the second certain time period, the compressor motor is completely stopped (S770). Besides the temporarily stopping (pause) described with reference to FIG. 6, by completely stopping the compressor motor under certain conditions, unnecessary power consumption can be reduced, an overload in the controlling apparatus can be prevented, and protection of the circuit elements in the controlling apparatus can be strengthened.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

According to the motor controlling method and apparatus of an air conditioner according to the present invention, the compressor motor operates according to the operational conditions of the fan motor, and thus, the present invention can be applicable to prevent an overload.

What is claimed is:

1. A motor controlling method of an air conditioner, comprising:
    estimating a velocity based on an output current flowing in a compressor motor;
    generating a current command value based on the estimated velocity and a velocity command value;
    generating a voltage command value based on the current command value and the output current; and
    generating a compressor inverter switching control signal based on the voltage command value;
    determining whether or not an operating frequency of the compressor motor is the same as or greater than a predetermined frequency;

determining whether or not a detected velocity of an outdoor fan motor is the same as or lower than a predetermined velocity during a first time period; and temporarily stopping the compressor motor if the operating frequency is the same as or greater than the predetermined frequency and the detected velocity is lower than the predetermined velocity during the first time period.

2. The method of claim 1, further comprising:

counting a number of times of temporarily stopping the compressor motor.

3. The method of claim 2, further comprising:

re-starting the compressor motor;

determining whether or not the counted number is the same as or greater than a predetermined number during a second time period; and completely stopping the compressor motor if the counted number is the same as or greater than the predetermined number during the second time period.

4. The method of claim 3, further comprising:

displaying an error on an error display unit if the compressor motor is completely stopped.

5. A motor controlling apparatus of an air conditioner, comprising:

a compressor inverter that drives a compressor motor;

a fan inverter that drives an outdoor fan motor;

a velocity detecting unit that detects the velocity of the fan motor; and a controller that temporarily stops the compressor motor if an operating frequency of the compressor motor is the same as or greater than a predetermined frequency and the detected velocity of the fan motor is lower than a predetermined velocity during a first time period, wherein the controller comprises an estimating unit to estimate a velocity based on an output current flowing in the compressor motor;

a current command generating unit to generate a current command value based on the estimated velocity and a velocity command value;

a voltage command generating unit to generate a voltage command value based on the current command value and the output current; and a switching control signal output unit to generate a compressor inverter switching control signal based on the voltage command value.

6. The apparatus of claim 5, wherein the controller comprises:

a first determining unit that determines whether or not the operating frequency of the compressor motor is the same as or greater than a predetermined frequency;

a second determining unit that determines whether or not the detected velocity of the fan motor is the same as or lower than a predetermined velocity during a first time period; and a stop determining unit that outputs a pause signal to temporarily stop the compressor motor, if the operating frequency is the same as or greater than the predetermined frequency and the detected velocity is the same as or lower than the predetermined velocity during the first time period.

7. The apparatus of claim 6, wherein the controller further comprises:

a counter that counts a number of times of temporarily stopping the compressor motor.

8. The apparatus of claim 7, wherein the controller further comprises:

a third determining unit that determines whether or not the counted number is the same as or greater than a predetermined number during a second time period, and the stop determining unit outputs a complete pause signal to completely stop the compressor motor.

9. The apparatus of claim 8, wherein the controller further comprises:

an error display unit that displays an error when the compressor motor is completely stopped.

10. The apparatus of claim 5, wherein the controller controls the compressor inverter and the fan inverter.

* * * * *